United States Patent

Pauwels et al.

Patent Number: 5,572,521
Date of Patent: Nov. 5, 1996

[54] PACKETIZER ARRANGEMENT HAVING PACKETIZER CONTROL MEANS (OBC) FOR CONTROLLING A PACKETIZER PROCESSING MEANS (PM)

[75] Inventors: Bart J. G. Pauwels, Tessenderlo; Filip Callens, Hoegaarden, both of Belgium

[73] Assignee: Alcatel NV, Netherlands

[21] Appl. No.: 426,026

[22] Filed: Apr. 21, 1995

[30] Foreign Application Priority Data

Apr. 22, 1994 [EP] European Pat. Off. ............ 942001112

[51] Int. Cl.⁶ .................................................. H04L 12/56
[52] U.S. Cl. ............................... 370/60; 370/82; 370/94.1
[58] Field of Search .................................. 370/58.1, 58.2, 370/58.3, 60, 61, 79, 80, 82, 83, 84, 94.1, 99, 110.1, 112, 43

[56] References Cited

U.S. PATENT DOCUMENTS

| 4,700,341 | 10/1987 | Huang | 370/80 |
| 5,008,878 | 4/1991 | Ahmadi et al. | 370/60 |
| 5,115,431 | 5/1992 | Williams et al. | 370/94.1 |
| 5,229,992 | 7/1993 | Jurkvich et al. | 370/82 |
| 5,251,217 | 10/1993 | Travers et al. | 370/79 |
| 5,384,770 | 1/1995 | Mays et al. | 370/61 |

FOREIGN PATENT DOCUMENTS

| 0365693 | 9/1988 | European Pat. Off. |
| 0528085 | 2/1993 | European Pat. Off. |

OTHER PUBLICATIONS

Excerpt from book "Transmission networking: Sonet and the Synchronous Digital Hierachy" by M. Sexton, sections 3.4 to 3.8.

"Application of the multipath self–routing switch in a combined STM/ATM cross–connect system" by B. Pauwels et al International Switching Syumposium, Oct. 1992, Yokohama, vol. 1, pp. 324–328.

Description of a byte algorithm as described in the book "Principles of Interactive Computer Graphics" by W. M. Newman, pp. 25–27.

International Conference on Integrated Broadband Service and Networks, 15 Oct. 1990, London, pp. 73–78, D. G. Fischer, N. Tay, M. Djuran, "An Open Network Architecture for INtegrated Broadband Communications".

Primary Examiner—Alpus H. Hsu
Attorney, Agent, or Firm—Ware, Fressola, Van Der Sluys & Adolphson

[57] ABSTRACT

A packetizer arrangement is disclosed with at least one packetizer device (PDPI1..PDPIM, PDPO1..PDPOM) for generating packets of respective individual packet streams from corresponding respective individual data streams (IDS1..IDSN) which are multiplexed and form part of an incoming data stream (CDS). Each of the packets includes a set of subsequent data portions of a corresponding respective individual data stream, and a last data portion included in the set is the one incoming substantially a time interval after a packet immediately preceding the present packet has been generated, this time interval corresponding to the length of this packet.

8 Claims, 2 Drawing Sheets

5,572,521

PACKETIZER ARRANGEMENT HAVING PACKETIZER CONTROL MEANS (OBC) FOR CONTROLLING A PACKETIZER PROCESSING MEANS (PM)

TECHNICAL FIELD

The present invention relates to a packetizer arrangement including at least one packetizer device for generating packets of respective individual packet streams from corresponding respective individual data streams which are multiplexed and form part of an incoming data stream, each one of said packets including a set of subsequent data portions of a said corresponding respective individual data stream.

BACKGROUND OF THE INVENTION

Such a packetizer arrangement is already known in the art, e.g. from the article 'Application of the multipath self-routing switch in a combined STM/ATM cross-connect system', by B. Pauwels et al., International Switching Symposium, October 1992, Yokohama, Vol. 1, pp. 324–328. Therein, the incoming data stream is constituted by a Synchronous Digital Hierarchy (SDH) signal according to a STM-N (Synchronous Transport Module-N) frame wherein VC-n (Virtual Containers-n) are mapped, the individual data streams being mapped into these VC-n. The packet streams are applied to a packet switch and all data portions of a same individual data stream, i.e. all packets of a same packet stream, are switched to a same output of this packet switch. This packet switch is a so-called multipath self-routing (MPSR) switch wherein the paths followed by different packets of a same packet stream may be different (multipath), and wherein a packet is routed from an input to an output of the packet switch on the basis of a self-routing tag included in this packet. In order to switch the individual data streams or VC-n from inputs to outputs of the packet switch, the VC-n are packetized into multi slot cells (MSC) constituting the packets of the packet streams. Each packet includes a first slot including a self-routing tag indicating to which packet switch output the packet is to be switched, and further slots comprising a number of consecutive bytes belonging to an individual data stream, these bytes constituting the set of subsequent data portions.

Due to the way in which the individual data streams (VC-n) are multiplexed in the incoming data stream (STM-N frame), a plurality of packets may become ready for being forwarded to the packet switch at nearly the same time, i.e. with intervals of only one byte. Thereby, when the number of individual data streams multiplexed in the incoming data stream exceeds the number of packets which can be simultaneously forwarded to the packet switch, not all packets can be forwarded to the packet switch at the time they become ready therefor so that some of them have to be buffered in an input buffer. Thereby, these packets are submitted to an additional delay which is at most about equal to the packetization delay. Indeed, in view of the fact that the maximum bit rate for data of the individual data streams output from a packetizer device obviously has to be at least equal to the bit rate at which this data is input to this packetizer device, the packet can always be forwarded to the packet switch within this maximal additional delay. Furthermore, it should be noted that subsequent packets of a packet stream are formed with intervals which are about equal to the packetization delay, so that the additional delay is not allowed to be longer than the packetization delay in order to prevent the sequence order of the packets from being lost.

On the other hand, the packet switch has a plurality of inputs to each of which packets derived by the packetizer arrangement from individual data streams are provided. Furthermore, the packet switch used has the characteristic that the switching delay between any of its inputs and any of its outputs follows a sharply peaked distribution, i.e. is substantially a constant. When different packets destined to the same packet switch output are simultaneously released by the packetizer arrangement to different packet switch inputs and are hence substantially simultaneously received by the latter same output, a contention problem occurs, i.e. the packets have to be buffered at this output. Therefore, a buffer is included in the packet switch which is dimensioned so as to be able to handle such a simultaneous arrival of a number of packets. Even with such a buffer, packet loss may occur. However, when the incoming data stream is an STM data stream, traffic patterns of the packets are persistent, i.e. the packet loss occurs on a regular basis. In order to break this persistent behaviour, randomization of the instant at which the packet is forwarded from the packetizer arrangement to the packet switch may be introduced at the inputs. This may be done by means of the above mentioned input buffer. Randomization is then most effective when the introduced randomization delay is uniformly distributed between zero and the packetization delay, i.e. when the maximum value of the above additional delay is made as large as possible. Remembering the restriction already mentioned above that this maximum value should not exceed the packetization delay, the maximal additional delay is advantageously chosen equal to the packetization delay.

Furthermore, even when the forwarding instant of the packets to the packet switch is randomized as described above, the forwarding instants of the packets are not evenly distributed in time, i.e. the packets are still forwarded in bursts to the packet switch which causes an increased packet loss ratio in the packet switch and an increased switching delay from input to output of the packet switch, both with respect to a situation wherein the packets are forwarded to the packet switch at a more evenly spread or constant rate.

SUMMARY OF THE INVENTION

An object of the present invention is to provide a packetizer arrangement of the above known type but wherein contention between packets output therefrom is avoided without a substantial additional delay being introduced.

According to the invention, this object is achieved due to the fact that said packetizer device includes processing means for determining a last data portion to be included in a set as the data portion incoming substantially a time interval after a packet immediately preceding the present packet has been generated, said time interval corresponding to the length of said packet.

In this way, by an appropriate choice of the time interval the packets derived from the incoming data stream become ready for being output from the packetizer arrangement at substantially evenly spread moments in time. Thereby, the packets can be substantially immediately output from the packetizer arrangement upon arrival of the last data portion to be included therein, i.e. substantially no buffering of the packets is required. Thus, contention between packets to be output from the packetizer arrangement is avoided without a substantial additional delay being introduced.

Furthermore, the packets are not output from the packetizer arrangement in bursts but substantially evenly spread in time. As a consequence, the packet loss rate in a packet switch to which the packet streams are applied and the maximum switching delay between inputs and outputs thereof are reduced with respect to a situation wherein packets are forwarded in bursty mode to this packet switch and are only slightly or not increased with respect to a situation wherein packets are forwarded to this packet switch at a more evenly spread rate.

Another characteristic of the present invention is that said packets have a data part with a variable length for containing said set of subsequent data portions.

Thus, the moment at which a packet is ready to be forwarded to the packet switch may be chosen by simply modifying the length of the data part thereby indicating or choosing the data portion constituting the last data portion included in the packet.

Yet another characteristic of the present invention is that said packets each have a data part with a predetermined length for containing at least partially said subsequent data portions.

Thus, the moment at which a packet is ready to be forwarded to the packet switch may be chosen by simply filling the data part with more or less data portions, i.e. by possibly not completely filling this data part. Thereby, the data portion constituting the last data portion included in the packet is chosen.

Still a further characteristic of the present invention is that the bit rates of said individual data streams are substantially constant, and that for each of said packets, said data part starts with a predetermined data portion.

In this way, when the data parts of predetermined length of the packets are completely filled, the choice of the predetermined data portion for a packet determines when the last data portion therefor arrives, viz. a fixed time interval after the latter predetermined data portion. Thus, by appropriately choosing the predetermined data portions, the latter data portions are assured to arrive when no other packets are being forwarded to the switch.

An even further characteristic feature of the present invention is that it includes a plurality of said packetizer devices each coupled to an input of a packet switch and providing packets thereto to be switched to outputs of said packet switch, that packets of a same individual packet stream are switched to a same output of said packet switch, and that for each of said packetizer devices, said last data portion of a first packet of said individual data streams provided thereby is randomly chosen.

Thereby, since the choice of the last data portion of the first packet of an individual data stream is randomized, only a low probability exists that at an output of the packet switch a contention problem occurs which is due to the fact that more packets than can be output simultaneously, these packets originating from different packetizer devices, arrive simultaneously at this packet switch output. It should be noted that this probability is reduced with reference to a situation wherein no such randomization is applied.

Yet another feature of the present invention is that it includes a plurality of said packetizer devices each coupled to an input of a packet switch and providing packets thereto to be switched to outputs of said packet switch, that packets of a same individual packet stream are switched to a same output of said packet switch, and that for each of said packetizer devices, said last data portion of a first packet of a said individual packet stream provided thereby is determined by the bandwidth available at the packet switch output to which the latter first packet is to be switched.

Thereby, since the choice of the last data portion is determined by the bandwidth availability at the packet switch output to which the packet is switched, the probability is yet reduced that at an output of the packet switch a contention problem occurs which is due to the fact that more packets than can be output simultaneously, these packets originating from different packetizer devices, arrive simultaneously at this packet switch output.

In a further embodiment of the present invention, each of said packets is submitted to a predetermined delay when being switched from a said packet switch input to a said packet switch output, and that prior to said switching of said first packet a timing message is transmitted from the output it is to be switched to to the input it is provided to, said timing message indicating said bandwidth available at the latter output by indicating the moments in time at which packets are received by the latter output, and the number of packets then being received.

In this way, by indicating the moments at which packets are received and the number of packets then being received, the instant at which the packet should be forwarded to the packet switch to avoid contention at the output may be determined by simply subtracting the predetermined delay from an optimal moment for receiving a packet at the latter output, i.e. the last data portion may thus be chosen. It should be noted that when the number of packets being received at each moment at the output is too high, contention may still be minimized by randomly choosing this moment and thereby the last data portion.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
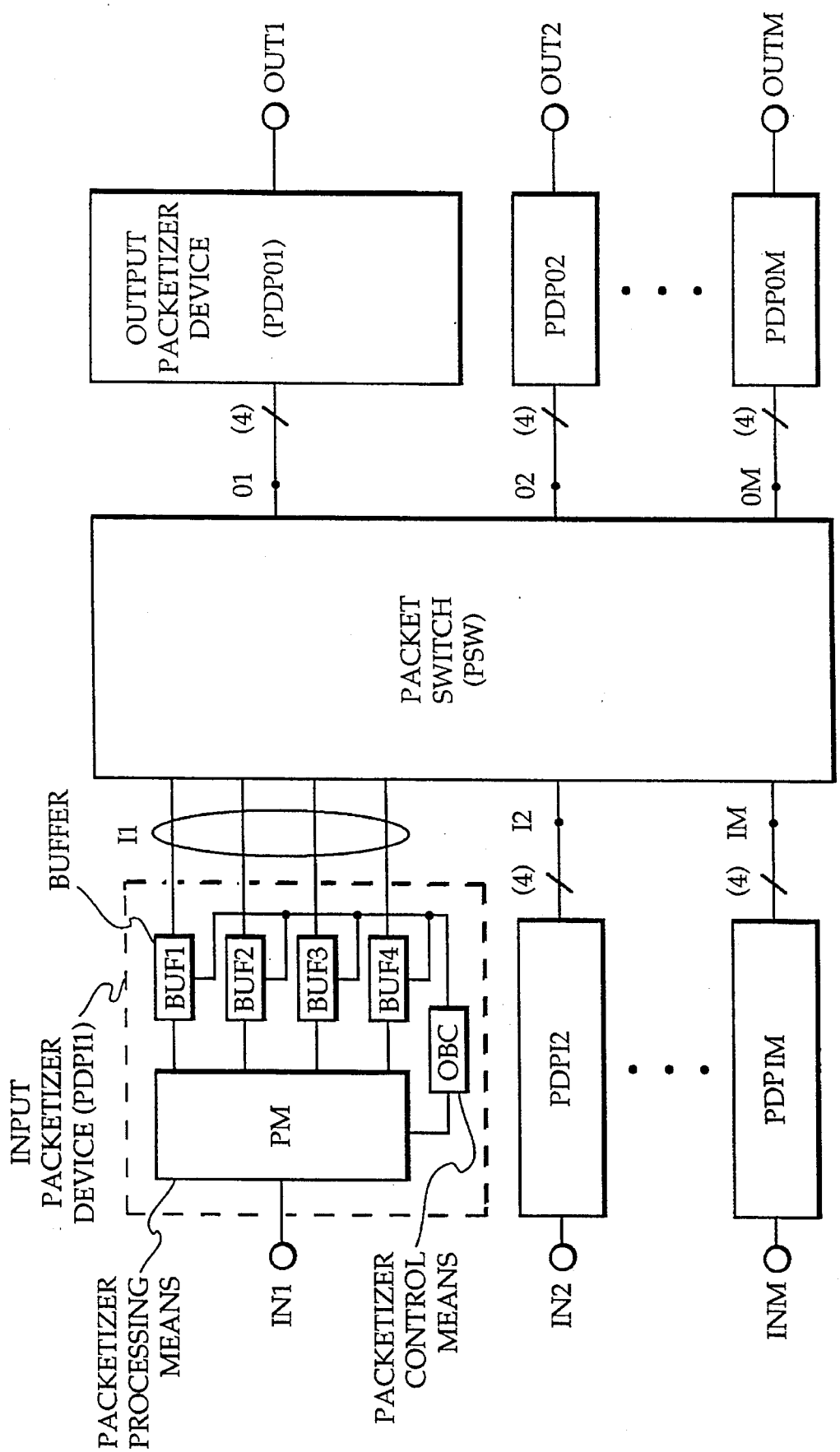
FIG. 1 represents a switching node having a packetizer arrangement according to the invention which includes packetizer devices PDPI1 to PDPIM and PDPO1 to PDPOM.

The switching node shown in FIG. 1 includes an input packetizer arrangement with packetizer devices PDPI1 to PDPIM, a packet switch PSW with N inputs I1 to IM and M outputs O1 to OM, and an output packetizer arrangement with packetizer devices PDPO1 to PDPOM. The packetizer devices PDPI1 to PDPIM are connected between respective inputs IN1 to INM of the switching node and respective ones of the inputs I1 to IM of the packet switch PSW. Likewise, the packetizer devices PDPO1 to PDPOM are connected between respective ones of the outputs O1 to OM of the packet switch PSW and respective outputs OUT1 to OUTM of the switching node. All links between the various packetizer devices and the packet switch PSW are four-wire bidirectional links, whilst all inputs and outputs of the packet switch PSW are in fact constituted by four-terminal input-outputs. Likewise, all inputs and outputs of the switching node are in fact input-output terminals. The packetizer devices PDPI1 to PDPIM arrange data streams applied to any of the inputs IN1 to INM into packets which are then switched via the packet switch PSW to one or more of the outputs thereof. The latter packets are then depacketized into output data streams by respective ones of the packetizer devices PDPO1 to PDPOM. Likewise, a data stream applied to any of the outputs OUT1 to OUTM of the switching node, which now indeed operates as an input, is arranged in packets by the packetizer devices PDPO1 to PDPOM whereafter these packets are switched via PSW to one or more of the inputs I1 to IM thereof, which now operate as outputs. The latter packets are then depacketized into a data stream by respective one of the packetizer devices PDPI1 to PDPIM. Thus, the packetizer devices PDPI1 to PDPIM and PDPO1 to PDPOM each perform packetizing as well as depacketizing operations.

The packetizer device PDPI1 includes a packetizer PM a data input of which constitutes the input IN1 of PDPI1. The packetizer PM furthermore has four data outputs each coupled to a respective one of the four terminals of the four-terminal input-output I1 of PSW via a respective one of four buffers BUF1 to BUF4 also included in the packetizer device PDPI1. Finally, the packetizer device includes a control means OBC controlling the operation of the packetizer PM and of the buffers BUF1 to BUF4. The packetizer devices PDPI2 to PDPIM and PDPO1 to PDPOM are built in a similar way as PDPI1.

The packet switch PSW is a so-called multipath self-routing (MPSR) switch which is described e.g. in the article 'Application of the multipath self-routing switch in a combined STM/ATM cross-connect system', by B. Pauwels et al., International Switching Symposium, October 1992, Yokohama, Vol. 1, pp. 324–328. Packets applied to an input of such a MPSR switch are so-called multi-slot cells (MSC) including a number of so-called slots. Each multi-slot cell includes a self-routing tag indicative of one or more of the outputs O1 to OM of the switch to which it is to be switched, and a connection reference number identifying a connection to which the packet belongs.

The operation of the switching node is now described hereinafter with reference to FIGS. 1 and 2.

Figure 2:
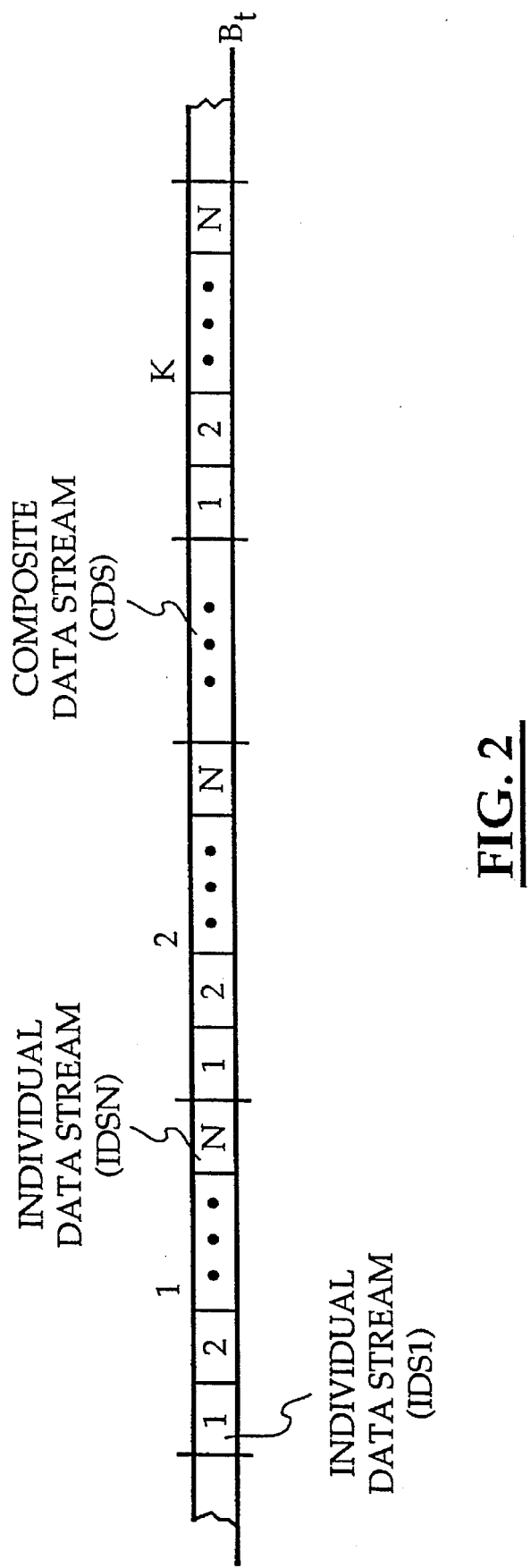
FIG. 2 shows an incoming composite data stream CDS applied to the switching node of FIG. 1.

To each of the inputs IN1 to INM of the switching node a composite data stream, e.g. the composite data stream CDS shown in FIG. 2, may be applied. This composite data stream CDS is for instance a Synchronous Digital Hierarchy (SDH) signal with a STM-N (Synchronous Transport Module-N) frame into which VC-n (Virtual Containers-n) are mapped, i.e. which comprises the VC-n and composite overhead data. Individual data streams IDS1 to IDSN and individual overhead data are mapped into the VC-n. Thus, beside overhead data which is not shown, the composite data stream CDS includes the N interleaved individual data streams IDS1 to IDSN whose data portions are indicated by numerals 1 to N, respectively. Such mapping of the individual data streams IDS1 to IDSN in the VC-n and of the VC-n in the STM-N frame is described e.g. in the book 'Transmission networking: SONET and the Synchronous Digital Hierarchy', by M. Sexton e.a., published by Artech House, Boston, 1992, sections 3.4 to 3.8.

In order to be able to be switched by the packet switch PSW the composite data stream CDS is arranged in packets each comprising a number of slots. Furthermore, each of the individual data streams IDS1 to IDSN belongs to a separate connection indicated by a connection reference number, i.e. data of a same individual data stream is switched to the same output which may however be different for different individual data streams. Therefor, each packet includes, next to overhead data including the self-routing tag and the connection reference number, only data portions of a same individual data stream. The arrangement of the composite data stream CDS as well as the addition of the overhead data is performed in the packetizer device to which the composite data stream CDS is applied. For instance, the composite data stream CDS applied to the input IN1 is arranged in packets in the packetizer device PDPI1, whereafter these packets are applied to the input I1 of the packet switch PSW. The paths followed by different packets of a same packet stream, i.e. derived from a same individual data stream, may be different, but the delay of a packet between an input and an output of the switch has a sharply peaked distribution, i.e. its value is substantially constant.

In a first embodiment the rearrangement operation in this packetizer device PDPI1 is performed without taking the load on the outputs of the packet switch into account. Supposing that the composite data stream CDS is applied to the input IN1 and is to be arranged in PDPI1 in packets having a predetermined constant length of K bytes and that the individual data streams IDS1 to IDSN are byte-interleaved in the composite data stream CDS, i.e. the bytes of each of the individual data streams IDS1 to IDSN appear once every N bytes in the composite data stream CDS, then a packet of any of the individual data streams should be forwarded to the packet switch at least once every N times K bytes. The bytes to be included in each packet are so chosen that upon arrival of a last such byte the packet may substantially immediately be forwarded to the packet switch PSW. Therefor, considering (as shown in FIG. 2) a time window of K times N bytes beginning with a byte of the first individual data stream IDS1, upon arrival of the above last byte, OBC controls PDPI1 to forward a first packet for the first individual data stream IDS1 to one of the buffers BUF1 to BUF4 which are controlled by OBC to forward their contents to the packet switch PSW. It should be noted that the four-terminal input outputs of PSW and accompanying four-wire links and buffers BUF1 to BUF4 cause the data rate to and from PSW to be decreased by a factor four. However, the operation in the first embodiment is described here with reference to a situation with one-terminal input outputs of PSW and accompanying one-wire links and single buffer. This first packet includes K bytes of IDS1 the last of which is the latter first byte, and has been completely forwarded to the packet switch upon arrival of the (K+1)-th byte of the time window. A that time a first packet for the second individual data stream IDS2 is forwarded to PSW. The last byte included in the latter first packet is the x-th byte of the time window, in which x=j×N+2 where j is the largest integer for which x still is less than or equal to K+1. Thereby, since forwarding of the latter first packet has to be postponed until the first packet of IDS1 has been completely forwarded, the first packet of IDS2 which was already sent to the buffer by PDPI1 upon arrival of the x-th byte, is buffered during K−j×N−1 bytes. Thus, when $$\frac{K-1}{N}$$

is an integer then no buffering is needed since in that case j is chosen equal to $$\frac{K-1}{N}$$

so that x is equal to K+1. Likewise, first packets of the other individual data streams IDS3 to IDSN are subsequently forwarded to the packet switch PSW. For instance, the last byte included in the first packet of the individual data stream IDSk where k is an integer between 3 and N, is the y-th byte of the time window, where y=j×N+k, where j is the largest integer for which y is still less than or equal to (k−1)×K+1.

The latter first packet which was already sent to the buffer by PDPI1 upon arrival of the y-th byte, thus has to be buffered for (k−1)×K−j×N−k+1 bytes which is zero when $$\frac{(k-1)\times(K-1)}{N}$$

is an integer. Indeed in that case j is chosen equal to $$\frac{(k-1)\times K-k+1}{N}$$

so that y is equal to (k−1)×K+1 and no buffering is required. Thus, when $$\frac{K-1}{N}$$

is an integer, no buffering is required. It should be noted that when $$\frac{K-1}{N}$$

is not an integer, minimal buffering is obtained in the above way. Furthermore, it is clear that the first packets derived from the composite data stream CDS when first applied to the switching node include less data portions. Thus, in case constant length packets are used, as described above, these first packets are not completely filled with data portions. On the other hand, one could use variable length packets in which case these first packets have a shorter length than subsequent ones.

Another embodiment wherein load restrictions on the outputs are taken into account is now described in detail hereinafter.

When a composite data stream, e.g. the composite data stream CDS shown in FIG. 2, is applied to the input IN1 of the switching node, it is arranged in packets consisting of a number a slots, these packets then being switched via the packet switch PSW to one or more of the outputs thereof. In that case a connection has to be set up for each of the individual data streams IDS1 to IDSN of CDS, i.e. times have to be calculated at which packets derived from the various individual data streams IDS1 to IDSN may be applied to the packet switch PSW in order not to cause contention at the input packetizer arrangement nor at the output packetizer arrangement. Likewise, when a new individual data stream is included in the composite data stream CDS, a new connection has to be set up for this new individual data stream.

For each individual data stream for which a new connection is to be set up, for instance a new connection for a new individual data stream IDS1 between the input IN1 and the output OUT2 of the switching node, the following algorithm is performed.

First, a message is sent from the control means OBC of the packetizer device PDPI1, henceforth referred to as origination control means OBCo, to the control means of the packetizer device PDPO2, henceforth referred to as destination control means OBCd. This message communicates to OBCd the time points at which packets are already being transmitted by PDPI1. Then, in OBCd a new time point for transmitting packets derived from the new individual data stream IDS1 is calculated according to a reset timing algorithm described later. This new time point is expressed as a time value TSTPVAL with respect to a periodically reoccurring time reference with period TSTPR. Thus, the new time point actually refers to a time point periodically reoccurring with period TSTPR and henceforth referred to as reset time point. OBCd then stores this new time point TSTPVAL in a not shown memory of OBCd and sends a message to OBCo communicating TSTPVAL thereto, whereafter the new time point TSTPVAL is stored in a not shown memory of OBCo. To be noted that since all packets are submitted to a substantially constant value delay between inputs and outputs of the packet switch PSW, a fixed time relation between PDPI1 and PDPO2 exists, i.e. a packet sent by PDPI1 to PSW arrives a fixed time, viz. the constant value delay, later at PDPO2. Furthermore, the composite data stream CDS is a SDH stream with a fixed bit rate so that the time relation between subsequent packets derived therefrom is also substantially fixed but not completely due to overhead bytes in the STM-1 frame, to so-called pointer decrements or pointer increments, to frequency shifting between the data rate of the composite data stream comprising the individual data stream IDS1 and the data rate of the packets transmitted to PSW as will become clear later. Thereby, a substantially fixed time relation exists between subsequent packets derived from a same individual data stream.

Then, a first packet derived from IDS1 is transmitted by PDPI1 to the packet switch PSW at the new time point. This first packet contains the data portions of the new individual data stream IDS1 which have already arrived at PDPI1 at the new time point. The first packet is the first of a number of packets transmitted at the above reset time points, the latter packets being henceforth referred to as reset packets. Further packets, henceforth referred to as intermediate packets, are transmitted to PSW at intermediate time points between the reset time points. The latter intermediate time points are calculated by OBCo according to an intermediate timing algorithm described now.

The number of intermediate packets s which have to be transmitted to the packet switch PSW between two reset packets is s=r(b/p) with $$r(\xi)=int(\xi)+1-int(1-\xi+int(\xi)).$$

Herein, b=B×TSTPR is the number of bytes of the new individual data stream IDS1 which have to be transmitted to the packet switch between two reset packets, B being the useful byte rate of IDS1, i.e. the byte rate of the bytes to be transmitted to PSW—to be noted that this useful byte rate B of IDS1 is not necessarily equal to the total byte rate of IDS1 which also accounts for overhead not transmitted to PSW—and TSTPR being the above mentioned time reference period, i.e. the time interval between two reset time points, and p is the number of usable bytes per packet. Note that s=b/p when b/p is an integer, and s=int(b/p)+1 when b/p is not an integer.

The packets are transmitted at 155.52 Mbit/sec and each consist of 2 slots of 68 bits each. Due to an overhead of 1 slot contained in each packet and of 1 byte and 4 bits in each slot, each packet may carry p=7 usable bytes. The time interval TSTPR corresponds to 512 slots, i.e. 224.8 μsec. When for instance the individual data stream IDS1 is mapped in a so-called virtual container VC-11 which contains 26 bytes per STM-1 frame period of 125 μsec, then the useful byte rate B is equal to $^{26}/_{125}$ Mbyte/sec, and the number of bytes b is equal to 46.565. Thus, the number of intermediate packets s is equal to 7. To be noted that the number of bytes b is an average number and that due to overhead bytes in the STM-1 frame, to so-called pointer decrements or pointer increments, to frequency shifting between the data rate of the composite data stream comprising the individual data stream IDS1 and the data rate of the packets transmitted to PSW, the number of bytes to be included in packets in the time interval TSTPR may vary. In general this may cause the number of intermediate packets s to vary. In that case, an extra packet may have to be transmitted to the packet switch PSW just before a reset packet. It may be verified that for the above example of VC-11 mapping in STM-1 frames the occurring variation is such that the total number of bytes to be transmitted between two reset packets varies between 45 and 49. This number of intermediate packets s has to be transmitted to the packet switch PSW between two reset packets, i.e. within a time interval TSTPR.

In order to minimize packet loss and delay in the packet switch PSW, the intermediate packets should be transmitted to the packet switch PSW at such intermediate time points that together with the reset packets transmitted at the reset time points a packet stream is obtained which is as synchronous as possible. Since the packets should be transmitted immediately upon arrival of a last byte of the individual data stream IDS1 to be included therein in order to avoid buffering thereof as much as possible, these intermediate time points must coincide with time points at which bytes of IDS1 are received. Thus, these intermediate time points may be represented by points approximating a line in a two-dimensional diagram where the coordinates are the times at which bytes of IDS1 are received by PDPI1 and the number of intermediate packets forwarded to PSW since the last reset time point. Both coordinates may only be discrete values, viz. the discrete times at which bytes of IDS1 are received by PDPI1, and the numbers of 0 to s for the number of intermediate packets sent to PSW since the last reset packet, 0 indicating a reset packet and s indicating the next reset packet. The intermediate timing algorithm then consists in performing for each new byte of IDS1 a byte algorithm as shown on the following page, which is based on the so-called Bresenham algorithm known in the art and described for instance in the book 'Principles of Interactive Computer Graphics', by W. M. Newman e.a., McGraw-Hill International Student Editions, 1979, pp. 25 to 27.

---

```
TIMEREL = (BYTETIME-TSTPVAL) mod512
   if ((0≦TIMEREL<256) and (RESPACK=1))
then:    Packet ready
         e = dx
         RESPACK = 0
else:    e = e+dy
         if (e≧0)
            then:    Packet ready
                     e = e-dx
         if (256≦TIMEREL)
            then: RESPACK = 1
```
---

In this byte algorithm, BYTETIME is an integer from 0 to 511 indicating the time in number of slots with respect to the last begun time interval TSTPR at which the byte for which the byte algorithm is performed was received by PDPI1. TSTPVAL is already mentioned above and indicates the reset time point in number of slots with respect to the last begun time interval TSTPR at which the last reset packet was transmitted to the packet switch PSW. TSTPVAL is determined by the already mentioned reset timing algorithm described later. Thus, TIMEREL is an integer from 0 to 511 indicating in number of slots with respect to the last reset time point the time at which the byte for which the byte algorithm is performed was received by PDPI1. RESPACK is a one-bit value indicating that a reset packet has to be transmitted to the packet switch PSW or not when it equals a binary one or zero, respectively. RESPACK is reset to 0 when a reset packet has been transmitted to PSW, and is set to 1 after a number of slots here chosen equal to 256. To be noted that this number of slots must be large enough to ensure a value of TIMEREL lower than this number of slots to be found, but less than 512, i.e. a byte of the individual data stream IDS1 should arrive at PDPI1 between the last reset time point, where TIMEREL would equal 0, and this number of slots after this last reset time point, where TIMEREL would equal 256 for the above example. The command 'Packet ready' indicates that a packet is ready for being transmitted to the packet switch PSW. When the byte algorithm has been executed without the latter command having been executed, the new byte for which the byte algorithm was executed is stored in the packetizer PM. Otherwise, when the command 'Packet ready' is executed then the latter new byte is included in the packet together with the bytes already collected in the packetizer PM and transmitted to PSW via a respective one of the buffers BUF1 to BUF4 assigned to IDS1. The value e represents an integer variable used in the byte algorithm. The values dy and dx represent the numerator and the slope of the above approximating line, respectively. These values dy and dx are chosen such that they may be represented by only a small number of bits and that the value dx/dy lies close to the average value of packets b/p to be transmitted per time interval TSTPR. For instance, for the above example where the number of intermediate packets s is equal to 7, dy is chosen equal to 3 and dx is chosen equal to 20.

Thus, for each new byte of IDS1 arriving at PDPI1 the value of TIMEREL is calculated. For a first new byte arriving after the reset time point, this value of TIMEREL lies between 0 and 256 and the value of RESPACK is 1, whereby a reset packet is sent to PSW, the value of e is set at −dx and RESPACK is reset to 0. For further bytes of IDS1 arriving at PDPI1 until a next reset time point, e is incremented with dy and the byte is stored in the packetizer PM (not indicated in the byte algorithm), until the value of e becomes positive in which case a packet is forwarded to the packet switch PSW and the value of e is decremented by dx. Furthermore, when TIMEREL is large enough, i.e. larger than 256, RESPACK is again set to 1.

This leads to the following table wherein 'packnum' indicates the number of the intermediate packet transmitted since the last reset packet which is indicated by a value of 'packnum' equal to 0 in the table. 'Trigbyte' indicates the number of the byte of IDS1 received since the last reset packet and for which the above command 'Packet ready' is executed. Thus, 'trigbyte' indicates the last byte of IDS1 included in the packet with number 'packnum'. 'Packbyte' indicates the number of bytes included in the packet with number 'packnum'.

| packnum | trigbyte | packbyte |
|---------|----------|----------|
| 0       | 0        | variable |
| 1       | 7        | 7        |
| 2       | 14       | 7        |
| 3       | 20       | 6        |
| 4       | 27       | 7        |
| 5       | 34       | 7        |
| 6       | 40       | 6        |
| 7       | 47       | 7        |

Herein, the following equation is valid:

$$\text{trigbyte} = 7 \times \text{packnum} - \text{in}\left(\frac{\text{packnum} \times (7 \times a - b)}{a}\right)$$

and 'packbyte' is the difference between 'trigbyte' and the previous value of 'trigbyte'. The last line of the table where 'packnum' equals 7 indicates a possible extra intermediate packet to be transmitted to the packet switch PSW before a next reset packet, viz. when the number of bytes of IDS1 to be transmitted to the packet switch PSW within the time interval TSTPR is larger than 47. In that case, the reset packet transmitted after this extra intermediate packet may contain only one or two bytes depending upon the total number of bytes to be transmitted to PSW during the time interval TSTPR. To be noted that when for instance only 45 bytes must be sent to PSW within this time interval TSTPR, then the reset packet contains only 5 bytes. This is clear from the variable number of 'packbyte' for 'packnum' equal to 0 in the table.

Thus, the sequence of the intermediate time points between two reset time points constitutes an approximately synchronous sequence, its synchronicity only being disturbed by the already mentioned overhead bytes in the STM-1 frame, by the pointer decrements and increments and by the fact that a packet is only transmitted upon arrival of a last byte to be included therein.

The reset timing algorithm for determining the reset time points referred to above is now described in detail hereafter.

Since each packet contains two slots, the possible reset time points may be indicated by an even value of TSTPVAL. For the above example with the time interval TSTPR corresponding to 512 slots and the number of intermediate packets s equal to 7 in this time interval TSTPR, a packet is transmitted to PSW every S=73.143 slots on the average. Thus, within a time interval of length S 36 possible values for TSTPVAL may be distinguished, viz. the even numbers between 0 and 73.143, except for the value 72 since the value 73.143 corresponds to a value 0 for a next interval of 73.143 slots and since the difference between this value and 72 is less than two slots. Thus, the possible values of TSTPVAL within the time interval of length S, henceforth referred to as reduced reset time point TSTPRED, are the even values between 0 and T, where T equals 70 in the above example. The difference S–T is referred to as TSTP-excess which for the above example equals 3.143.

Of these possible values of TSTPRED a value is chosen with the following requirements:

at each possible value of TSTPRED at most three packets may be sent to PSW so that at most three of the four lines connecting the packetizer arrangement to the packet switch PSW are used, whereby a failure of one of these lines does not pose any problems;

the number of packets transmitted to PSW should be distributed as equally as possible over all possible values of TSTPRED.

In order to obtain a smooth distribution of the packets over all possible values of TSTPRED a weight function $w(\xi)$, where $\xi$ is the distance in number of slots to a chosen candidate value x of TSTPRED, is chosen as follows:

$$w(\xi) = \begin{cases} \frac{1}{|\xi|} & \text{if } |\xi| \geq 1 \\ 2 - |\xi| & \text{if } |\xi| \leq 1 \end{cases}$$

A phase contribution function c(f,x) is then calculated which is function of a phase distribution function f(x). Various such phase distribution functions f(x) may be distinguished, viz. fo(x) having as a value the number of packets transmitted from the origination packetizer device PDPI1 to PSW at time x, fd(x) having as a value the number of packets received from PSW at time x in the destination packetizer device PDPO2 on the same link on which the packets from IDS1 are received, and fd'(x), fd"(x) and fd'"(x) having as a value the number of packets received from PSW at time x in the destination packetizer device PDPO2 but on the respective other links than the one on which the packets from IDS1 are received. The phase contribution function c(f,x) is the sum of the values of the phase distribution $f(\xi)$ weighted by $w(\xi)$ for values of $\xi$ in an interval with the above length S and symmetrically extending around x. To be noted that the phase distribution $f(\xi)$ is periodical with a period equal to this length S. Thus, when $f(\xi)$ is known in a reference interval R with $\xi$ between 0 and S, then $$c(f,x)=c0(f,x)+c1(f,x)+c2(f,x)+c3(f,x)$$

wherein:

c0(f,x)=2f(x) represents the contribution of the phase distribution in x;

$$c1(f,x) = \sum_{i=i1}^{T} \frac{f(i)}{x+T-i+s}$$

represents the contribution of the phase distribution in a first extension interval left of the reference interval R;

$$c2(f,x) = \sum_{\substack{i=i2 \\ i \neq x}}^{i3} \frac{f(i)}{|x-i|}$$

represents the contribution of the phase distribution in the reference interval R; and $$c3(f,x) = \sum_{i=0}^{i4} \frac{f(i)}{T-x+s+i}$$

represents the contribution of the phase distribution in a second extension interval right of the reference interval R.

Herein, with $$r(\xi)=int(\xi)+1-int(1-\xi+int(\xi)),$$

as already mentioned above, the values of i1, i2, i3 and i4 are:

when $x \leq \frac{S}{2} - s$, then $i1 = 2 \times r\left(\frac{x + \frac{S}{2}}{2}\right)$, $i2 = i4 = 0$, and $i3 = 2 \times int\left(\frac{x + \frac{S}{2}}{2}\right)$;

when $x \geq \frac{S}{2}$, then $i1 = i3 = T$, $i2 = 2 \times r\left(\frac{x - \frac{S}{2}}{2}\right)$, and $i4 = 2 \times int\left(\frac{x - \frac{S}{2}}{2}\right)$; and when $\frac{S}{2} - s < x < \frac{S}{2}$, then $i1 = i3 = T$, and $i2 = i4 = 0$.

TSTPRED is now determined as follows. For all possible values x of TSTPRED for which the value f(x) is less than three, calculate $$cdo(x)=c(9fd+fd'+fd''+fd'''+fo, x)$$

and keep as possible values for TSTPRED only those values x for which cdo(x) reaches a minimal value. It should be noted that the weight of 9 assigned to fd(x) avoids low values of the phase distribution functions fd'(x), fd"(x) and fd'''(x) to compensate for a high value of fd(x). Furthermore, since packets may only be forwarded to the packet switch PSW via the link associated to IDS1 three times slower than when they are equally spread over the three other links, this weight should indeed be three times larger than the summed weights of fd'(x), fd''(x) and fd'''(x). It is however clear that other values of the weight assigned to fd(x) may cause the reset timing algorithm to perform equally well but with somewhat modified phase spreading characteristics. For the remaining possible values x calculate cd(x)=c(fd, x) and keep as possible values for TSTPRED only those values x for which cd(x) reaches a minimal value md. It should be noted that this minimal value should be less than a threshold value in order to avoid overflow of packets in the output packetizer arrangement. When md is larger than this threshold value, no new connection for IDS1 is set up. If only one possible value of x remains, this is chosen as TSTPRED. If more than one possible value of x remains, calculate co(x)= c(fo, x) and choose as value for TSTPRED a value of x for which co(x) reaches a minimal value mo.

From the thus calculated value of TSTPRED, TSTPVAL is calculated as follows. An overall phase contribution function C(f,x) is calculated as follows.

$$C(f,x) = 2f(x) + \sum_{\substack{I=i1 \\ I \neq x}}^{511} \frac{f(i)}{x+512-I} + \sum_{I=I2}^{I3} \frac{f(I)}{|x-I|} +$$

$$\sum_{I=0}^{I4} \frac{f(I)}{512-x+I}$$

Herein, when x<256: I1=x+256=I3 and I2=0=I4, and when x>256: I1=511=I3 and I2=x−256=I4.

For each possible value x for TSTPVAL, i.e. for each value TSTPRED+j×S, where j is an integer from 0 to s−1 which is equal to 6, s and S already being mentioned above, C(fo, x) is now calculated. The value of x for which C(fo, x) reaches a minimal value is then chosen as value for TSTPVAL.

It is to be noted that when a byte of IDS1 would arrive at PDPI1 at the reset time point, the reset packet and subsequent intermediate packets do not have to be buffered in the buffers BUF1 to BUF4. However, due to the fact that the reset packet is not sent to PSW at the reset time point, but upon arrival of the first byte of IDS1 at or after this reset time point, some buffering may still be necessary in the buffers BUF1 to BUF4. Furthermore, when in the above reset timing algorithm the value of the phase contribution function cd(x) is too large for all remaining possible values x of TSTPVAL, then one of these remaining possible values x may be randomly chosen as value for TSTPVAL. In that case, the packets for this connection have to be buffered in the buffers BUF1 to BUF4 until they can be sent to PSW.

While the principles of the invention have been described above in connection with specific apparatus, it is to be clearly understood that this description is made only by way of example and not as a limitation on the scope of the invention.

We claim:

1. A packetizer arrangement including at least one packetizer device (PDPI1, . . ., PDPIM, PDPO1, . . . , PDPOM) having packetizer processing means (PM) for generating packets of respective individual packet streams from corresponding individual data streams (IDS1, . . . , IDSN) which are multiplexed and form part of an incoming data stream (CDS), each one of said packets including a set of subsequent data portions of a respective one of said corresponding individual data streams (IDS1, . . . , IDSN), characterized in that said at least one packetizer device (PDPI1, . . . , PDPIM, PDPO1, . . . , PDPOM) includes packetizer control means (OBC) adapted to control said packetizer processing means (PM) to determine a last data portion of the set of subsequent data portions as a data portion incoming substantially a time interval after an immediately preceding packet has been generated, said time interval corresponding to a length of said immediately preceding packet.

2. A packetizer arrangement according to claim 1, characterized in that said packets each has a data part with a variable length for containing said subsequent data portions.

3. A packetizer arrangement according to claim 1, characterized in that said packets each has a data part with a predetermined length for containing at least partially said subsequent data portions.

4. A packetizer arrangement according to claim 3, characterized in that said corresponding individual data streams (IDS1, . . . , IDSN) have bit rates that are substantially constant, and that for each of said packets, said data part starts with a predetermined data portion.

5. A packetizer arrangement according to claim 4, characterized in that said bit rates of said corresponding individual data streams (IDS1, . . . , IDSN) have a predetermined proportionality, and that said data portions of each of said corresponding individual data streams (IDS1, . . . , IDSN) are substantially evenly spread over said incoming data stream (CDS).

6. A packetizer arrangement according to claim 1, characterized in that said packetizer arrangement includes a plurality of said packetizer devices (PDPI1, . . . , PDPIM, PDPO1, . . . , PDPOM) each coupled to a respective input (I1, . . . , IM) of a packet switch (PSW) and providing packets thereto to be switched to outputs (O1, . . . , OM) of said packet switch (PSW), said packet switch (PSW) switches respective packets of a same individual packet stream to a same output (O1, . . . , OM) of said packet switch (PSW), and for each of said packetizer devices (PDPI1, . . . , PDPIM, PDPO1, . . . , PDPOM), said packetizer processing means (PM) randomly chooses said last data portion of a first packet of said corresponding individual data streams (IDS1, . . . , IDSN).

7. A packetizer arrangement according to claim 1, characterized in that said packetizer arrangement includes a plurality of said packetizer devices (PDPI1, . . . , PDPIM, PDPO1, . . . , PDPOM) each coupled to a respective input (I1, . . . , IM) of a packet switch (PSW) and providing packets thereto to be switched to outputs (O1, . . . , OM) of said packet switch (PSW), said packet switch (PSW) switches respective packets of a same individual packet stream (IDS1, . . . , IDSN) to a same output (O1, . . . , OM) of said packet switch (PSW), and for each of said packetizer devices (PDPI1, . . . , PDPIM, PDPO1, . . . , PDPOM), said packetizer processing means (PM) determines said last data portion of a first packet of said corresponding individual packet stream by the bandwidth available at the output (O1, . . . , OM) of said packet switch (PSW) to which the first packet is to be switched.

8. A packetizer arrangement according to claim 7, characterized in that said packet switch (PSW) submits each of said packets to a predetermined delay when being switched from a said respective input (I1, ..., IM) of said packet switch (PSW) to a respective output (O1, ..., OM) of said packet switch (PSW), and prior to switching of said first packet a respective timing message is transmitted from the output (O1, ..., OM) to which said first packet is to be switched to the input (I1, ..., IM) to which said first packet is provided, said respective timing message indicating said bandwidth available at the latter output (O1, ..., OM) by indicating the moments in time at which said packets are received by the output (O1, ..., OM), and the number of packets then being received.

* * * * *

UNITED STATES PATENT AND TRADEMARK OFFICE
CERTIFICATE OF CORRECTION

PATENT NO. : 5,572,521
DATED : November 5, 1996
INVENTOR(S) : Pauwels et al.

It is certified that error appears in the above-indentified patent and that said Letters Patent is hereby corrected as shown below:

On the Title page, item [30] Foreign Application Priority Data,

Please delete "942001112" and insert --94201112--.

Signed and Sealed this

Fifth Day of August, 1997

Attest:

BRUCE LEHMAN

*Attesting Officer*    *Commissioner of Patents and Trademarks*